US009390672B2

(12) United States Patent
Chuang et al.

(10) Patent No.: US 9,390,672 B2
(45) Date of Patent: *Jul. 12, 2016

(54) DRIVING CIRCUIT OF A PIXEL OF A LIQUID CRYSTAL DISPLAY PANEL AND DRIVING METHOD THEREOF

(75) Inventors: Young-Ran Chuang, Hsin-Chu (TW); Kuan-Chun Huang, Hsin-Chu (TW); Ching-Huan Lin, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 318 days.

This patent is subject to a terminal disclaimer.

(21) Appl. No.: 13/479,280

(22) Filed: May 24, 2012

(65) Prior Publication Data

US 2013/0002640 A1 Jan. 3, 2013

(30) Foreign Application Priority Data

Jun. 28, 2011 (TW) ............................. 100122610 A

(51) Int. Cl.
*G06F 3/038* (2013.01)
*G09G 5/00* (2006.01)
*G09G 3/36* (2006.01)

(52) U.S. Cl.
CPC ...... *G09G 3/3659* (2013.01); *G09G 2300/0814* (2013.01); *G09G 2300/0876* (2013.01); *G09G 2310/0251* (2013.01); *G09G 2310/061* (2013.01)

(58) Field of Classification Search
CPC .............. G09G 2300/0876; G09G 2320/0247; G09G 2300/0809; G09G 3/3655; G09G 3/3659
See application file for complete search history.

(56) References Cited

U.S. PATENT DOCUMENTS 8,674,975 B2 * 3/2014 Chuang et al. ................ 345/211
2006/0023137 A1 * 2/2006 Kamada ............ G02F 1/136213 349/44
2006/0227273 A1 * 10/2006 Shin .................... G02F 1/13624 349/139
2008/0055216 A1 * 3/2008 Yen ...................... G09G 3/3648 345/87
2010/0103085 A1 4/2010 Lee
2010/0328279 A1 * 12/2010 Jung ................. G02F 1/136213 345/206

* cited by examiner

*Primary Examiner* — Temesgh Ghebretinsae
*Assistant Examiner* — Kwin Xie
(74) *Attorney, Agent, or Firm* — Winston Hsu; Scott Margo

(57) ABSTRACT

A driving circuit of a pixel includes a driving capacitor for driving liquid crystals according to a voltage difference between first and second ends of the driving capacitor, a reference voltage source for providing a reference voltage, a first data line for providing a first driving voltage, a second data line for providing a second driving voltage, a first scan circuit for electrically connecting the first and the second data lines to the first and the second ends of the driving capacitor respectively when the first scan circuit is turned on, a first scan line for controlling on and off states of the first scan circuit, a second scan circuit for electrically connecting the first end and the second end of the driving capacitor when the second scan circuit is turned on, and a second scan line for controlling on and off states of the second scan circuit.

12 Claims, 5 Drawing Sheets

DRIVING CIRCUIT OF A PIXEL OF A LIQUID CRYSTAL DISPLAY PANEL AND DRIVING METHOD THEREOF

BACKGROUND

1. Technical Field

The present embodiment relates to a driving circuit of a pixel of a liquid crystal display panel, and more particularly, to a driving circuit of a pixel of a liquid crystal display panel capable of preventing a magnetic hysteresis effect.

2. Description of the Prior Art

Please refer to FIG. 1. FIG. 1 is a diagram showing a driving circuit 100 of a pixel of a liquid crystal display panel of the prior art. As shown in FIG. 1, the driving circuit 100 of the pixel of the liquid crystal display panel of the prior art comprises a driving capacitor Cd, a reference voltage source Vcom, a first voltage stabilizing capacitor C1, a second voltage stabilizing capacitor C2, a first data line D1, a second data line D2, a scan circuit SC, and a scan line SL. The driving capacitor Cd drives liquid crystals of the pixel according to a voltage difference between two ends of the driving capacitor Cd. The reference voltage source Vcom is for providing a reference voltage. The first voltage stabilizing capacitor C1 is electrically connected to a first end of the driving capacitor Cd and the reference voltage source Vcom. The second voltage stabilizing capacitor C2 is electrically connected to a second end of the driving capacitor Cd and the reference voltage source Vcom. The first data line D1 is for providing a first driving voltage. The second data line D2 is for providing a second driving voltage. The scan circuit SC comprises a first transistor T1 and a second transistor T2. A first end of the first transistor T1 is electrically connected to the first data line D1, and a second end of the first transistor T1 is electrically connected to the first end of the driving capacitor Cd. A first end of the second transistor T2 is electrically connected to the second data line D2, and a second end of the second transistor T2 is electrically connected to the second end of the driving capacitor Cd. The scan line SL is electrically connected to a gate of the first transistor T1 and a gate of the second transistor T2 for controlling on and off states of the first transistor T1 and the second transistor T2.

According to the above arrangement, the liquid crystal display panel sequentially turns on the scan circuit SC (that is, turns on the first transistor T1 and the second transistor T2) of the driving circuit 100 of each pixel via the scan line SL of the driving circuit 100 of each pixel, for electrically connecting the first data line D1 and the second data line D2 to the first end of the driving capacitor Cd and the second end of the driving capacitor Cd respectively in order to generate a voltage difference between the first end and the second end of the driving capacitor Cd, that is, a voltage difference between the first driving voltage and the second driving voltage. The voltage difference drives the liquid crystals of the pixel to tilt at a certain angle for displaying images.

Please refer to FIG. 2. FIG. 2 is a diagram showing a magnetic hysteresis effect of the pixel of the liquid crystal display panel of the prior art. As shown in FIG. 2, a curve from low voltage difference to high voltage difference is different from a curve back from high voltage difference to low voltage difference, representing the so-called magnetic hysteresis effect. The liquid crystals have different tilt angles for the same voltage difference (or the pixel displays different brightnesses for the same gray level signal) due to the magnetic hysteresis effect, which further causes images displayed by the liquid crystal display panel to be unstable.

In order to prevent the magnetic hysteresis effect, the liquid crystal display panel of the prior art inserts a black frame between each two frames to reset the voltage difference between the two ends of the driving capacitor Cd to zero before applying the voltage difference from low to high. However, the above method requires increasing display frequency of the liquid crystal display panel to two times the original display frequency, which occupies a large amount of computing power of a processor, and further increases complexity and difficulty in design.

SUMMARY

The present embodiment provides a driving circuit of a pixel of a liquid crystal display panel comprising a driving capacitor, a reference voltage source, a first voltage stabilizing capacitor, a second voltage stabilizing capacitor, a first data line, a second data line, a first scan circuit, a first scan line, a second scan circuit, and a second scan line. The driving capacitor has a first end and a second end for driving liquid crystals of the pixel according to a voltage difference between the first end and the second end. The reference voltage source is for providing a reference voltage. The first voltage stabilizing capacitor is electrically connected to the first end of the driving capacitor and the reference voltage source. The second voltage stabilizing capacitor is electrically connected to the second end of the driving capacitor and the reference voltage source. The first data line is for providing a first driving voltage. The second data line is for providing a second driving voltage. The first scan circuit comprises a first transistor and a second transistor. A first end of the first transistor is electrically connected to the first data line, and a second end of the first transistor is electrically connected to the first end of the driving capacitor. A first end of the second transistor is electrically connected to the second data line, and a second end of the second transistor is electrically connected to the second end of the driving capacitor. The first scan line is electrically connected to a gate of the first transistor and a gate of the second transistor for controlling on and off states of the first transistor and the second transistor. The second scan circuit is electrically connected to the first end and the second end of the driving capacitor for electrically connecting the first end of the driving capacitor to the second end of the driving capacitor when the second scan circuit is turned on. The second scan line is electrically connected to the second scan circuit for controlling on and off states of the second scan circuit.

According to the above driving circuit, the prevent invention further provides a method for driving the pixel of the liquid crystal display panel. The method comprises in a first time slot of a predetermined period, turning on the first transistor and the second transistor via the first scan line, and turning off the second scan circuit via the second scan line; and in a second time slot of the predetermined period, turning off the first transistor and the second transistor via the first scan line, and turning on the second scan circuit via the second scan line.

The present embodiment further provides a driving circuit of a pixel of a liquid crystal display comprising a driving capacitor, a first data line, a second data line, a first scan circuit, a first scan line, a second scan circuit, and a second scan line. The driving capacitor has a first end and a second end for driving liquid crystals of the pixel according to a voltage difference between the first end and the second end of the driving capacitor. The first data line is for providing a first driving voltage. The second data line is for providing a second driving voltage. The first scan circuit is electrically connected to the first data line, the second data line, and the driving capacitor for controlling updating of the driving capacitor. The first scan line is electrically connected to the first scan circuit for controlling on and off states of the first scan circuit. The second scan circuit is electrically connected to the first end and the second end of the driving capacitor for resetting a voltage difference between the first end and the second end of the driving capacitor. The second scan line is electrically connected to the second scan circuit for controlling on and off states of the second scan circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
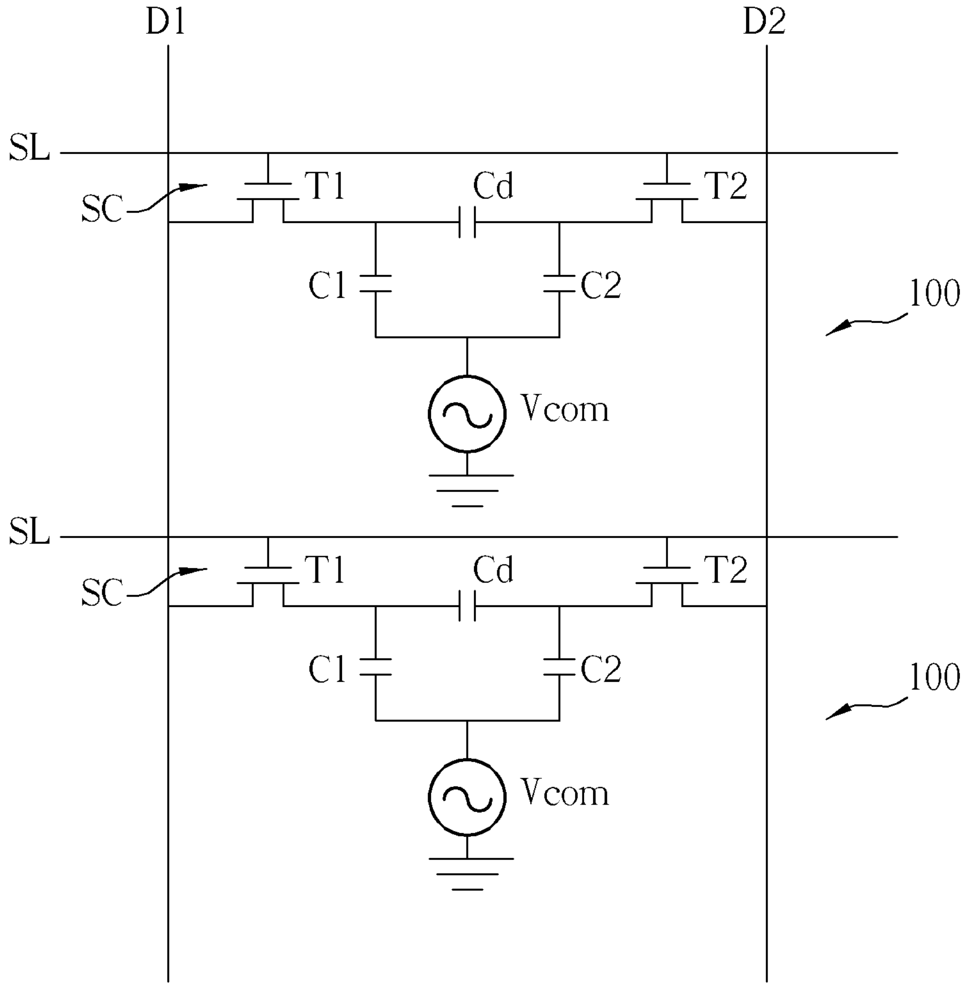
FIG. 1 PRIOR ART
FIG. 1 is a diagram showing a driving circuit of a pixel of a liquid crystal display panel of the prior art.
Figure 2:
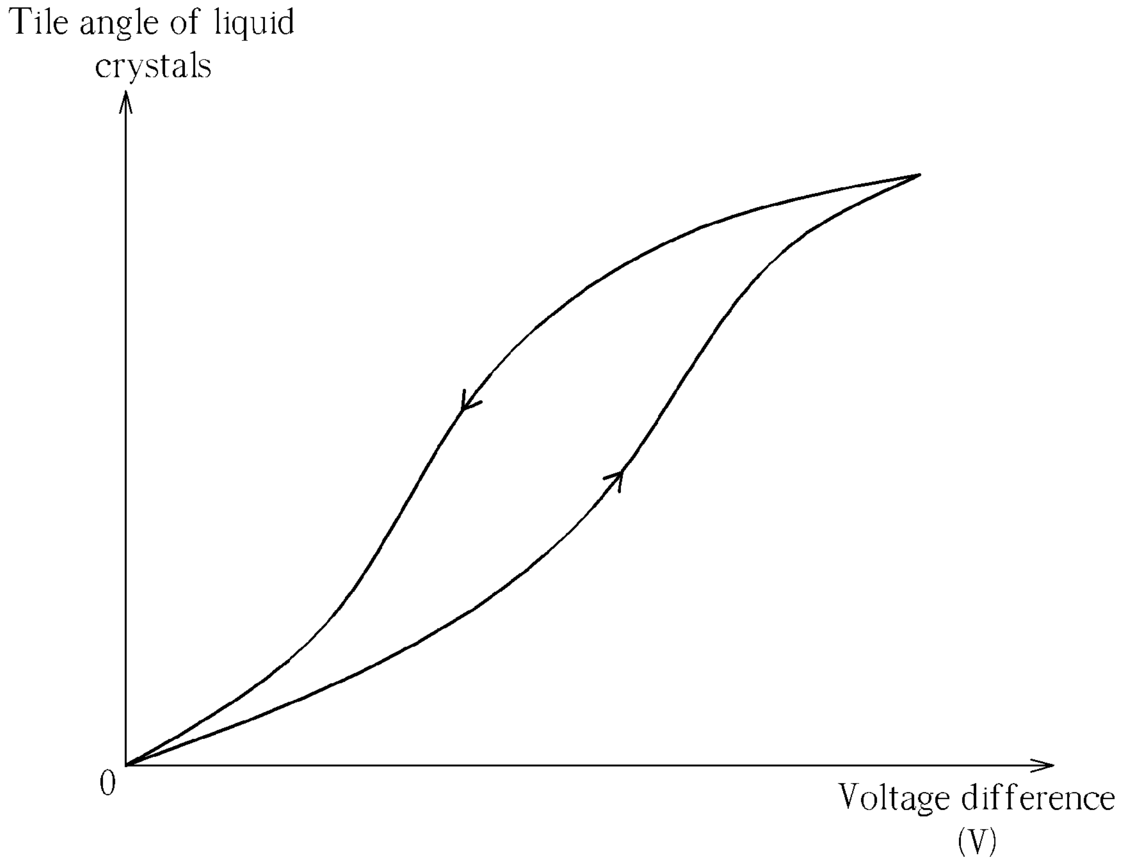
FIG. 2 PRIOR ART
FIG. 2 is a diagram showing a magnetic hysteresis effect of the pixel of the liquid crystal display panel of the prior art.
Figure 3:
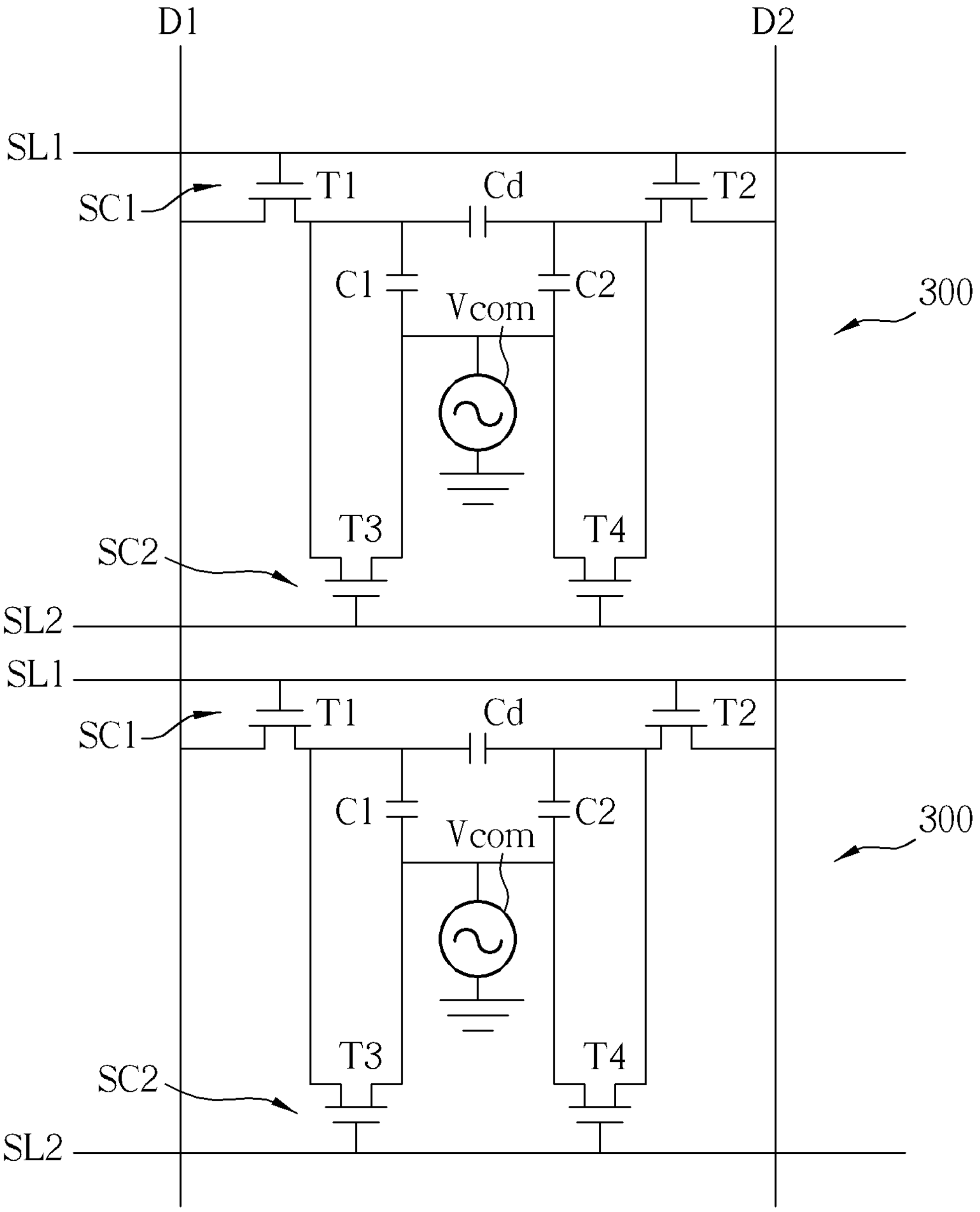
FIG. 3 is a diagram showing a driving circuit of a pixel of a liquid crystal display panel of the present invention.

Please refer to FIG. 3. FIG. 3 is a diagram showing a driving circuit 300 of a pixel of a liquid crystal display panel of the present invention. As shown in FIG. 3, the driving circuit 300 of the pixel of the liquid crystal display panel of the present invention comprises a driving capacitor Cd, a reference voltage source Vcom, a voltage stabilizing circuit, which comprises a first voltage stabilizing capacitor C1 and a second voltage stabilizing capacitor C2, a first data line D1, a second data line D2, a first scan circuit SC1, and a first scan line SL1. The driving circuit 300 of the pixel of the liquid crystal display panel of the present invention further comprises a second scan circuit SC2 and a second scan line SL2. The first scan circuit SC1 of the driving circuit 300 is similar to the scan circuit SC of the driving circuit 100, and the first scan line SL1 of the driving circuit 300 is similar to the scan line S of the driving circuit 100. The second scan circuit SC2 of the driving circuit 300 comprises a third transistor T3 and a fourth transistor T4. A first end of the third transistor T3 is electrically connected to the reference voltage source Vcom, and a second end of the third transistor T3 is electrically connected to a first end of the driving capacitor Cd. A first end of the fourth transistor T4 is electrically connected to the reference voltage source Vcom and a second end of the fourth transistor T4 is electrically connected to a second end of the driving capacitor Cd. The second scan line SL2 is electrically connected to a gate of the third transistor T3 and a gate of the fourth transistor T4 for controlling on and off states of the third transistor T3 and the fourth transistor T4.

Figure 4:
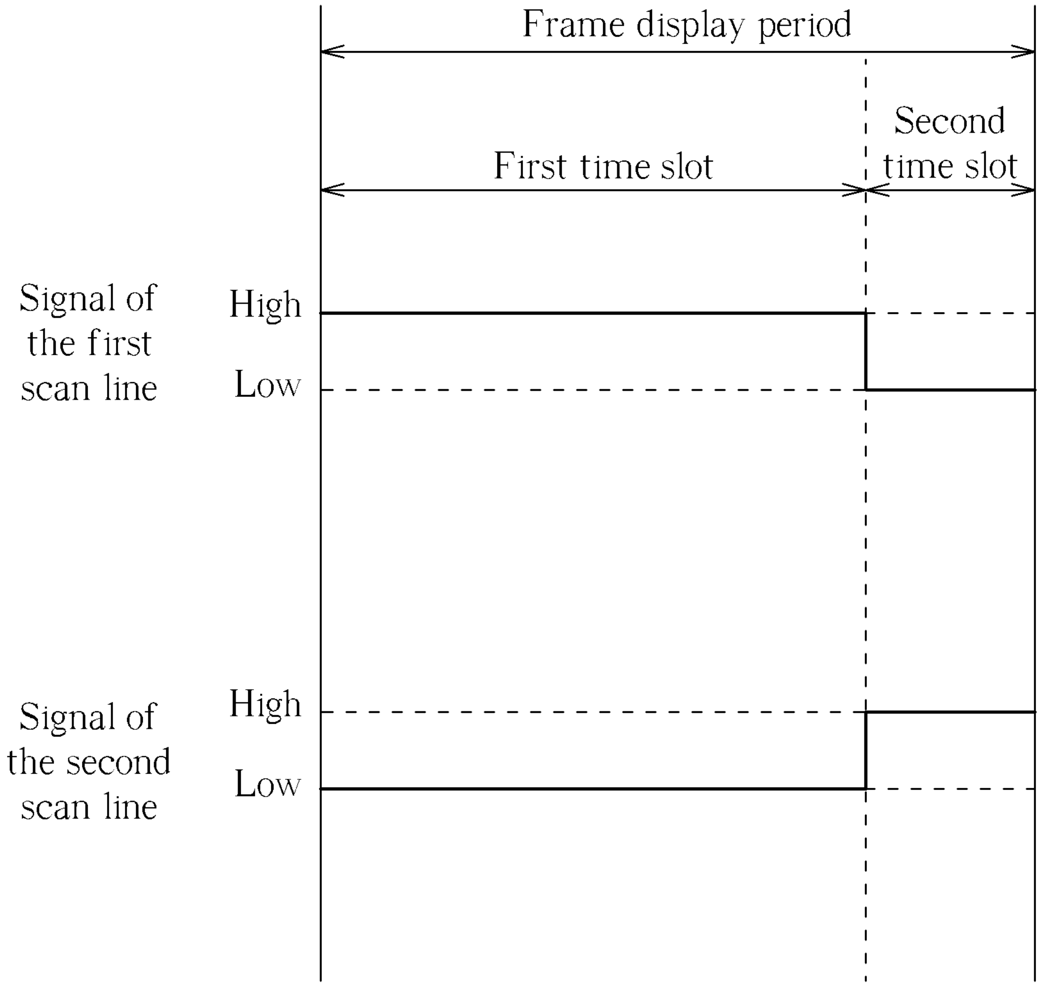
FIG. 4 is a diagram showing driving signals of the driving circuit of FIG. 3.

Please refer to FIG. 4 together with FIG. 3. FIG. 4 is a diagram showing driving signals of the driving circuit 300 of FIG. 3. According to the above arrangement, in each frame displaying period, the liquid crystal display panel sequentially turns on the first scan circuit SC1 and the second scan circuit SC2 (that is, turns on the first transistor T1 and the second transistor T2 of the first scan circuit SC1, and turns on the third transistor T3 and the fourth transistor T4 of the second scan circuit SC2) of the driving circuit 300 of each pixel via the first scan line SL1 and the second scan line SL2 of the driving circuit 300 of each pixel. In a first time slot, the first scan circuit SC1 is turned on and the second scan circuit SC2 is turned off. Therefore, the first transistor T1 electrically connects the first data line D1 to the first end of the driving capacitor Cd, and the second transistor T2 electrically connects the second data line D2 to the second end of the driving capacitor Cd, such that a voltage difference is generated between the first end and the second end of the driving capacitor Cd (that is, a voltage difference between a first driving voltage and a second driving voltage). In a second time slot, the first scan circuit SC1 is turned off and the second scan circuit SC2 is turned on. Therefore, the third transistor T3 electrically connects the reference voltage source Vcom to the first end of the driving capacitor Cd, and the fourth transistor T4 electrically connects the reference voltage source Vcom to the second end of the driving capacitor Cd, thereby eliminating the voltage difference between the first end and the second end of the driving capacitor Cd (the voltage levels of the first end and the second end of the driving capacitor Cd are equal to the reference voltage provided by the reference voltage source Vcom). The same processes are then performed in a driving circuit 300 of the next pixel.

According to the above method, the driving circuit 300 of the pixel of the liquid crystal display panel of the present invention can complete the processes of driving liquid crystals to tilt and then resetting the voltage difference between the two ends of the driving capacitor Cd to zero in a single frame displaying period. In addition, a ratio between a length of the first time slot and a length of the second time slot can be adjusted according to design requirements.

Figure 5:
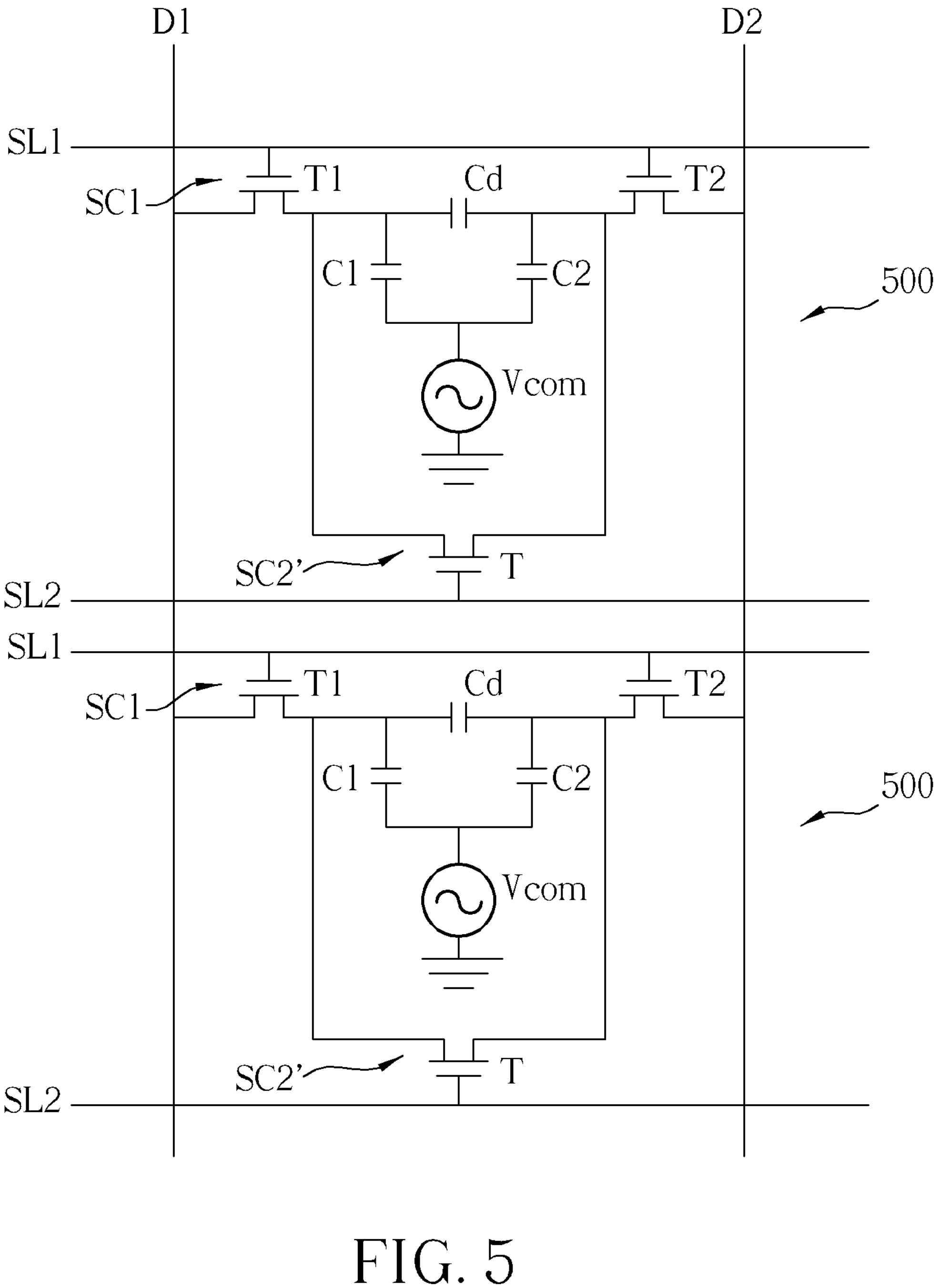
FIG. 5 is a diagram showing another driving circuit of a pixel of a liquid crystal display panel of the present invention.

Please refer to FIG. 5. FIG. 5 is a diagram showing another driving circuit 500 of the pixel of the liquid crystal display panel of the present invention. In the embodiment of FIG. 5, a second scan circuit SC2' comprises one transistor T. A first end of the transistor T is electrically connected to the first end of the driving capacitor Cd, and a second end of the transistor T is electrically connected to the second end of the driving capacitor Cd. A second scan line SL2 is electrically connected to a gate of the transistor T for controlling on and off states of the transistor T. According to the above arrangement, when the second scan circuit SC2' is turned on in the second time slot, the transistor T electrically connects the first end and the second end of the driving capacitor Cd, thereby eliminating the voltage difference between the first end and the second end of the driving capacitor Cd (the voltage levels of the first end and the second end of the driving capacitor Cd are the same due to the first end and the second end of the driving capacitor Cd being mutually coupled). Therefore, the embodiment of FIG. 5 can achieve the same effect as the embodiment of FIG. 3.

In addition, the transistors T1, T2, T3, T4, and T of the embodiments of FIG. 3 and FIG. 5 can be, but are not limited to, thin film transistors (TFT).

In contrast to the prior art, the driving circuit of the pixel of the liquid crystal display panel of the present invention and the driving method thereof can complete the processes of driving the liquid crystals and resetting the voltage difference between the two ends of the driving capacitor in a single frame displaying period. Therefore, the liquid crystal display panel does not need to increase the display frequency of the liquid crystal display panel to two times the original display frequency in order to prevent the magnetic hysteresis effect. The present invention decreases loading of a processor and further reduces complexity and difficulty in design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit of a pixel of a liquid crystal display panel, comprising:

a driving capacitor for driving liquid crystals of the pixel according to a voltage difference between a first end and a second end of the driving capacitor;

a reference voltage source for providing a reference voltage;

a voltage stabilizing circuit electrically connected to the first end of the driving capacitor, the second end of the driving capacitor, and the reference voltage source;

a first data line for providing a first driving voltage;

a second data line for providing a second driving voltage;

a first scan circuit electrically connected to the first data line, the second data line, and the driving capacitor;

a first scan line electrically connected to the first scan circuit for controlling on and off states of the first scan circuit;

a second scan circuit electrically connected to the first end and the second end of the driving capacitor for inputting a substantially identical voltage to the first end and the second end of the driving capacitor when the second scan circuit is turned on; and a second line electrically connected to the second scan circuit for controlling on and off states of the second scan circuit;

wherein the second scan circuit comprises:

a third transistor having a gate electrically connected to the second scan line, a first end electrically connected to the reference voltage source, and a second end directly connected to the first end of the driving capacitor, wherein one of the first end and the second end of the third transistor is a drain of the third transistor and the other one of the first end and the second end of the third transistor is a source of the third transistor; and a fourth transistor having a gate electrically connected to the second scan line, a first end electrically connected to the reference voltage source, and a second end directly connected to the second end of the driving capacitor, wherein one of the first end and the second end of the fourth transistor is a drain of the fourth transistor and the other one of the first end and the second end of the fourth transistor is a source of the fourth transistor;

wherein there is no capacitor arranged on a path from the reference voltage source to the first end of the driving capacitor through the first end and the second end of the third transistor.

2. The driving circuit of claim 1, wherein the voltage stabilizing circuit comprises:

a first voltage stabilizing capacitor electrically connected to the first end of the driving capacitor and the reference voltage source; and a second voltage stabilizing capacitor electrically connected to the second end of the driving capacitor and the reference voltage source.

3. The driving circuit of claim 1, wherein the first scan circuit comprises:

a first transistor having a first end electrically connected to the first data line, a second end electrically connected to the first end of the driving capacitor, and a gate electrically connected to the first scan line; and a second transistor having a first end electrically connected to the second data line, a second end electrically connected to the second end of the driving capacitor, and a gate electrically connected to the first scan line.

4. A driving circuit of a pixel of a liquid crystal display panel, comprising:

a driving capacitor for driving liquid crystals of the pixel according to a voltage difference between a first end and a second end of the driving capacitor;

a reference voltage source for providing a reference voltage;

a voltage stabilizing circuit electrically connected to the first end of the driving capacitor, the second end of the driving capacitor, and the reference voltage source;

a first data line for providing a first driving voltage;

a second data line for providing a second driving voltage;

a first scan circuit electrically connected to the first data line, the second data line, and the driving capacitor;

a first scan line electrically connected to the first scan circuit for controlling on and off states of the first scan circuit;

a second scan circuit electrically connected to the first end and the second end of the driving capacitor for inputting a substantially identical voltage to the first end and the second end of the driving capacitor when the second scan circuit is turned on; and a second line electrically connected to the second scan circuit for controlling on and off states of the second scan circuit;

wherein the second scan circuit comprises:

a third transistor having a gate electrically connected to the second scan line, a first end directly connected to the first end of the driving capacitor, and a second end directly connected to the second end of the driving capacitor.

5. A method for driving a pixel of a liquid crystal display panel, wherein a driving circuit of the pixel of the liquid crystal display panel comprises a driving capacitor for driving liquid crystals of the pixel, a reference voltage source, a first data line for providing a first driving voltage, a second data line for providing a second driving voltage, a first scan line, a second scan line, a first scan circuit, and a second scan circuit, the first scan circuit comprises a first transistor electrically connected to the first data line and the first end of the driving capacitor, and a second transistor electrically connected to the second data line and the second end of the driving capacitor, the first scan line is electrically connected to a gate of the first transistor and a gate of the second transistor, the second scan circuit is electrically connected to the first end and the second end of the driving capacitor for electrically connecting the first end of the driving capacitor to the second end of the driving capacitor when the second scan circuit is turned on, the second scan circuit comprising a third transistor having a gate electrically connected to the second scan line, a first end directly connected to the first end of the driving capacitor, and a second end directly connected to the second end of the driving capacitor, and the second scan line is electrically connected to the second scan circuit for controlling on and off states of the second scan circuit, the method comprising:

in a first time slot of a predetermined period, turning on the first transistor and the second transistor via the first scan line, and turning off the second scan circuit via the second scan line; and in a second time slot of the predetermined period, turning off the first transistor and the second transistor via the first scan line, and turning on the third transistor of the second scan circuit via the second scan line.

6. The driving method of claim 5 further comprising adjusting a ratio between a length of the first time slot and a length of the second time slot of the predetermined period.

7. The driving circuit of claim 4, wherein the voltage stabilizing circuit comprises:

a first voltage stabilizing capacitor electrically connected to the first end of the driving capacitor and the reference voltage source; and a second voltage stabilizing capacitor electrically connected to the second end of the driving capacitor and the reference voltage source.

8. The driving circuit of claim 4, wherein the first scan circuit comprises:

a first transistor having a first end electrically connected to the first data line, a second end electrically connected to the first end of the driving capacitor, and a gate electrically connected to the first scan line; and a second transistor having a first end electrically connected to the second data line, a second end electrically connected to the second end of the driving capacitor, and a gate electrically connected to the first scan line.

9. The driving circuit of claim 1, wherein there is no capacitor with two ends directly connected to the second end of the third transistor and the first end of the driving capacitor respectively, and there is no capacitor with two ends directly connected to the second end of the fourth transistor and the second end of the driving capacitor respectively.

10. The driving circuit of claim 1, wherein a voltage level of the second scan line is configured to control a current channel between the first end and the second end of the third transistor and a current channel between the first end and the second end of the fourth transistor to be conducted or cut off.

11. The driving circuit of claim 5, wherein one of the first end and the second end of the third transistor is a drain of the third transistor and the other one of the first end and the second end of the third transistor is a source of the third transistor.

12. The driving circuit of claim 1, wherein there is no capacitor arranged on a path from the reference voltage source to the first end of the driving capacitor through the first end and the second end of the fourth transistor.

* * * * *